United States Patent [19]

Blair

[11] 4,124,944
[45] Nov. 14, 1978

[54] DEVICE FOR TEACHING AND EVALUATING A PERSON'S SKILL AS A WELDER

[75] Inventor: Bruce A. Blair, Jackson, Mo.

[73] Assignee: Lenco, Inc., Jackson, Mo.

[21] Appl. No.: 813,950

[22] Filed: Jul. 8, 1977

[51] Int. Cl.² ............................................. G09B 19/24
[52] U.S. Cl. ........................................................ 35/13
[58] Field of Search ................... 35/9 C, 22 R, 13, 36, 35/37, 8 R; 273/1 E

[56] References Cited

U.S. PATENT DOCUMENTS

| | | | |
|---|---|---|---|
| 1,286,529 | 12/1918 | Cave | 35/8 R |
| 3,363,330 | 1/1968 | Kobler | 35/9 C |
| 3,673,708 | 7/1972 | Bevens | 35/37 |
| 3,683,516 | 8/1972 | Fass | 35/37 |
| 3,690,020 | 9/1972 | McBratnie | 35/37 |
| 3,691,650 | 9/1972 | Arnold et al. | 35/8 A |
| 3,774,318 | 11/1973 | Sterriti | 35/9 C |
| 3,867,769 | 2/1975 | Schow et al. | 35/13 |
| 4,041,615 | 8/1977 | Whitehill | 35/13 |

FOREIGN PATENT DOCUMENTS

| | | | |
|---|---|---|---|
| 54,931 | 4/1943 | Netherlands | 35/8 R |

*Primary Examiner*—Vance Y. Hum
*Attorney, Agent, or Firm*—Charles B. Haverstock

[57] ABSTRACT

An apparatus for simulating an arc welding operation, for training welders and for evaluating a welder's performance including a target representing a simulated weld to be made, mechanism for imparting predetermined motion to the target, a simulated welding tool including a simulated welding rod and a holder for the rod, the rod having a free end with an element adjacent thereto having properties capable of being sensed magnetically, a magnetic sensor assembly located adjacent to the target for movement therewith and including members capable of responding to the presence of the magnetic field produced by the magnetic element on the rod for producing responses depending upon the position of the simulated welding rod relative thereto and the distance of the rod therefrom, the magnetic sensor assembly including angularly related pairs of opposed sensor members arranged to produce responses to represent the position of the simulated welding rod relative thereto in two different angularly related directions, each of the sensor members being capable of producing a response when in the field of the magnetic element, an electric circuit connected to the sensor members of the aforesaid pairs including circuitry for combining the responses produced by selected ones of the sensor members to produce electric signals representative of the position of the free end of the rod relative to the sensor members and representative of the distance between the rod and the sensor assembly, and a sensor element located on the rod holder, the sensor element being constructed and positioned to respond to the angular orientation of the simulated welding rod relative to the target. The present apparatus also includes an electric circuit for producing audible responses and/or visual indications to simulate an arcing condition and to indicate and record errors that an operator makes in following the target during a simulated welding operation.

32 Claims, 6 Drawing Figures

DEVICE FOR TEACHING AND EVALUATING A PERSON'S SKILL AS A WELDER

The prior art has certain features which limit its capability and make it relatively unstable, inaccurate, unreliable and difficult to use. For example, one prior art device, unlike the present device, employs means located on a simulated welding rod holder, as distinguished from on or associated with the target, for sensing arc length which is the distance between the free end of the simulated welding rod and the target. In the present device, on the other hand, the arc length responses are produced by means located on or in association with the target not the rod holder. The prior art device also uses light sensitive sensor means including a light source located on the simulated welding rod, and a light sensitive sensor located in the target in position to respond to light from the light on the rod and the only signals that are produced by this arrangement are signals that indicate that the light is or is not shining on the sensor. This also means that with the prior art device the operator must maintain the light on the sensor at all times during operation. This also means there is no known way to know the direction in which the light moves relative to the target as there is in the present device. The present device has no light sensitive means as such and the multi-element sensor construction of the present device which uses magnetic sensitive means is able to achieve much more information including information as to east-west and north-south off target error, it achieves more stable and predictable operating conditions that can be achieved with the prior art device and the present sensor means are passive in that they do not require that the operator maintain the rod aimed at a particular target sensor. This is due in large part to the construction and use in the present device of pairs of opposed, preferably Hall Effect magnetic sensors, located on or in close proximity with the movable target which will produce plural responses whenever the sensors are in the magnetic field. The construction, location and operation of the sensor means employed in the present device represent an important fundamentally different approach and construction from the sensor means of the prior art, they operate differently, and in addition to the above advantages of the present sensor means, they also provide much better and more versatile control and sensing capability, and a better source of the output responses for use in evaluating the performance of an operator. They also provide a more accurate and versatile way to establish a desired path width. The fact that the sensing means of the present device can be operated passively, that is with minimum dependence on the operator as compared to the prior art which has an active sensor means which depend more on the operator is an important difference between the devices.

It is therefore a principal object of the present invention to provide improved sensor means for use in arc welding trainer and simulator devices.

Another object is to teach the construction and operation of passive as distinguished from active sensing means for use in a welding simulator.

Another object is to obtain more information for evaluating the performance of an arc welder.

Another object is to teach the construction and operation of a more stable arc welding simulator device by advantageously making use of opposing drift errors.

Another object is to provide sensor means for an arc welding simulator wherein the signals produced tend to add while the drift errors that are present tend to cancel.

Another object is to minimize the interaction between the various controls of a welding simulator device thereby making it easier to adjust and balance.

Another object is to enable more accurate and versatile control of the target shape used in a welding simulator device thereby enabling equal as well as unequal sensitivity to longitudinal and transverse tracking errors.

Another object is to establish a more uniform response to simulated arc length over a target area.

Another object is to teach the construction of a welding simulator and training device which is relatively less expensive and more stable than known devices, and one which can be constructed using fewer precision parts and components.

Another object is to minimize the gain requirements and hence the amplification of error or drift in simulated welding devices.

Another object is to teach the construction and operation of a welding simulator device which can be used to more accurately and precisely evaluate the performance capabilities of welding operators.

Another object is to reduce the time and expense required in training persons in the use of arc welding equipment.

Another object is to be able to train arc welders without wasting materials.

These and other objects and advantages of the present invention will become apparent after considering the following detailed specification in conjunction with the accompanying drawings, wherein.

Figure 1:
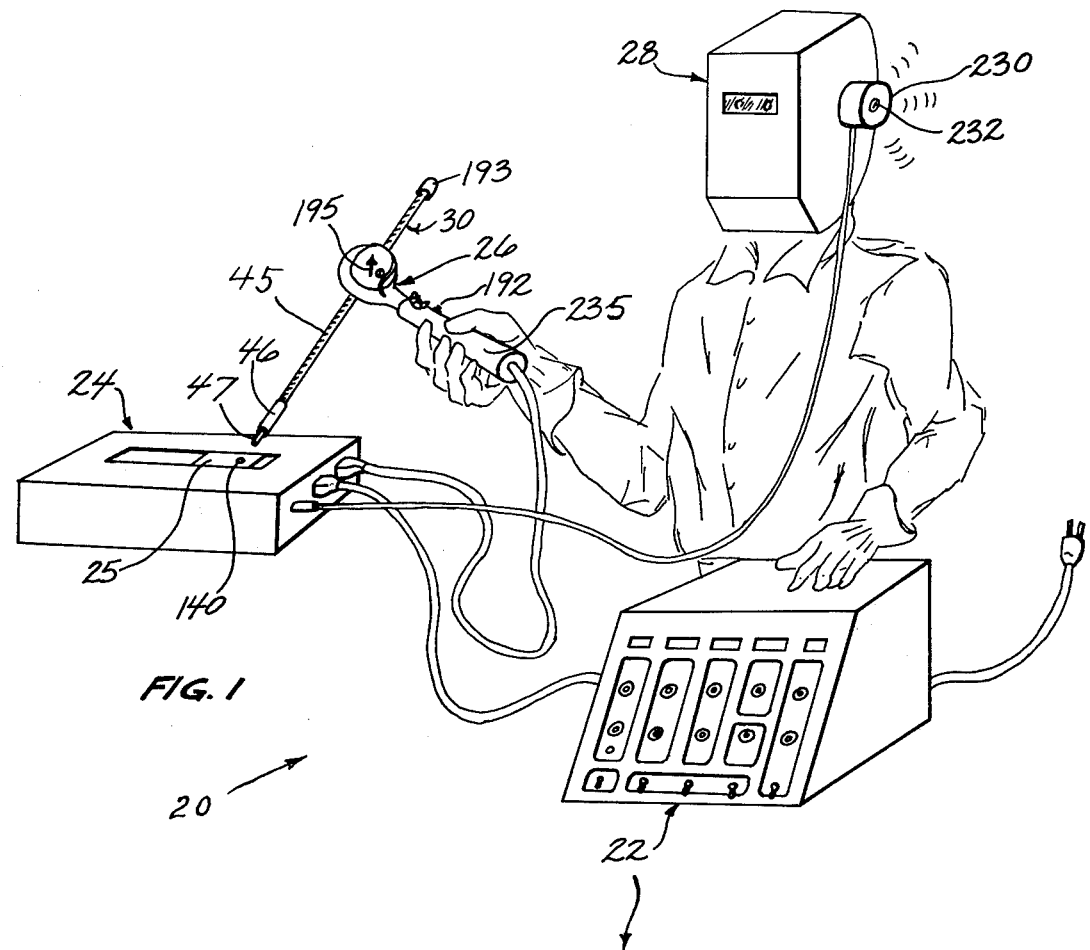
FIG. 1 is a perspective view of an arc welding simulator trainer constructed according to the teachings of the present invention.
Figure 6:
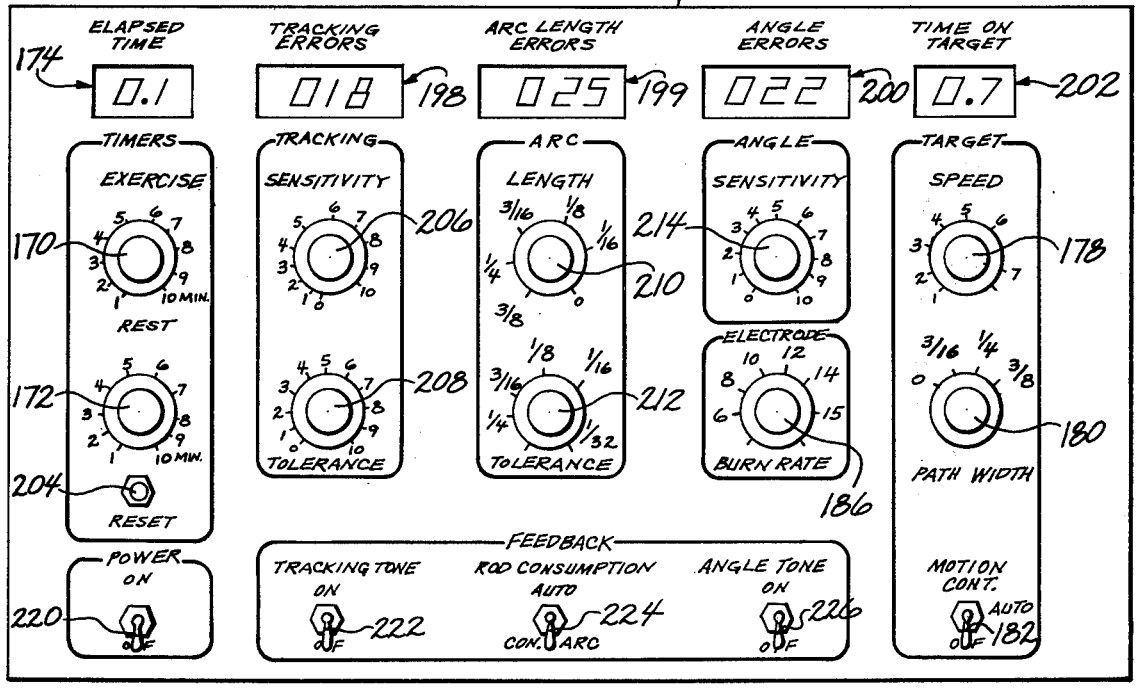

Referring to the drawings more particularly by reference numbers, number 20 identifies generally an arc welding simulator-trainer device constructed according to the present invention. The simulator-trainer 20 includes several components which are interconnected mechanically and electrically including a control console 22, a target assembly 24 including a movable target plate 25 sometimes also called a puddle, a stinger assembly 26 which is the portion of the device that is held and manipulated by the operator, and a welding helmet 28 which the operator wears and which includes speaker means where sound signals are produced to let the operator know how he is doing, including how many errors he is making, whether he is maintaining a proper angular orientation of the simulated welding rod, and so forth. All of the elements 24, 25, 26 and 28 are connected electrically to the console 22, and the console 22 has numerous control switches, dials, counters, indicator lights and other features as shown in FIG. 6 which can be adjusted and programmed to produce different operating conditions, and which indicate and/or record the progress and other operating characteristics and errors of the operator during a simulated welding operation. These will be described later.

Of special importance to the present simulator is the construction and operation of the sensor means which in the present construction are located in the target assembly 24 and move with the target plate 25. Several different things are sensed by the sensor means during operation and these produce counter readouts and other outputs. These include responses that represent the simulated arc length which is a parameter used to measure the ability of an operator to maintain a proper distance between the end of simulated welding rod 30 and the target plate 25, responses that represent the speed of movement of the simulated welding rod 30 relative to the target 25 as the target moves along the welding path, and responses that produce audible signals or noises in the helmet 28 to let the operator know how well he is doing and when and what kind of errors he is making. All of the above responses, or the absence or variations thereof, can be timed and used to record the various possible operator errors. The audible signals can also be used to indicate tracking errors, angle errors, arc length errors, or the absence of any one or more of each of these types of errors.

The circuits included in the console 22 include means for generating the various response signals and the audible signals produced in the helmet 28, and the console also includes counters or accumulators including electrooptical readout means which record time on target, rest time, and individually visually record and accumulate the various possible types of errors as they are made so that after a simulated welding operation the number of errors of each type will be presented and can be used to evaluate the operator's performance from many different standpoints. It is possible, for example, to determine both the good and bad performance characteristics of an operator in a single simulated run, and this can be done with a high degree of accuracy. Because of its capabilities the present device can be used not only to train and to test but it can also be used to weed out persons who are not suited to be welders, it can be used to identify those that have natural abilities as welders, and it can be used to give practice and training without any waste or materials since no consumable parts such as welding rods and parts to be welded are required. The present device is also able to indicate areas where special training is required. The advantages of being able to make these and other determinations and evaluations quickly, accurately and inexpensively are readily apparent.

As indicated above, the construction and operation of the sensor means employed in the present device are especially important. Furthermore, the fact that the present device uses magnetic sensor means as distinguished from optical, electrical and other forms of sensors is likewise important as is the fact that the sensor means of the present device are located on or closely adjacent to the target plate 25 and not in the stinger assembly 26 or elsewhere. The principal sensor means of the present device are identified in FIG. 3 by number 34 and include a substrate 36 on which are attached or mounted four sensor elements 38, 40, 42 and 44 located thereon in the positions as shown. The sensor elements 38–44 are preferably Hall Effect devices that are sensitive to magnetic characteristics as distinguished from electrical or optical characteristics and are located in opposed pairs 38 and 42, and 40 and 44. The opposed pair 38 and 42 is oriented relative to the target plate 25 transversely to the main or forward direction of movement of the simulated welding rod 30 during a simulated welding operation and this pair of sensors are used primarily to sense lateral or east-west tracking errors. The width of the simulated welding track and the sensitivity of the east-west sensors in the transverse direction are both adjustable by means on the console 22 which will be described later. The sensor pair 40 and 44 are the north-south sensors and are oriented in the forward-reverse or longitudinal direction relative to the main forward direction of simulated welding. This is also the principal but not the only direcòn of movement of the target plate 25. The responses sensed by the sensors 40 and 44 are used to measure the ability of the operation to keep up with the forward movement of the target plate 25, and the same responses will produce error outputs due to too rapid or too slow forward progress of the simulated rod 30 relative to the target. The tolerance range for acceptable welding in the longitudinal or forward direction can be adjusted as required as can the sensitivity in the same direction, and it is possible to have different tolerance and sensitivity characteristics in the north-south and in the east-west directions. Usually, however, the east-west or transverse tolerance (path width) will be less or narrower than the longitudinal tolerance and the sensitivity in the east-west direction will usually also be greater.

The simulated rod 30 extends through the stinger assembly 26 and has gear teeth 45 formed on one side which cooperate with motor drive means therefor in the stinger assembly 26. The rod 30 also has an enlarged portion or sleeve 46 located near to but not at the lower free end thereof. The sleeve 46 is provided for attaching a member 47 having magnetic characteristics and capable of producing a magnetic field which generates electric responses in the sensors 38–44 during a simulated welding operation. These responses are due to the magnetic interactions between the magnet 47 and the sensors when the sensors are in the field thereof, and these responses vary with the position of the rod 30 relative to the sensors.

Each of the sensors 38–44 has an electric connection by a respective lead 48–54 to electric circuits located in the target assembly 24 and in the console 22, and when the magnetic member 47 on the free end of the rod 30 is located equidistant from all of the sensors of each of the opposed pairs, equal responses will be produced in the sensors of each pair to indicate the condition. This is the central or on target condition. If, on the other hand, the magnetic member 47 is closer to one of the sensors of one of the pairs than it is to the other sensor of the same pair a larger response will be produced in the closer sensor, and this will cause an unbalanced condition which may or may not be large enough to produce an error depending on the setting of the controls on the console 22. It should be taken into account that the sensors 38–44 are located fairly close together so that the distance between the opposed sensors of each pair in the usual situation will be about $\frac{3}{8}$ inch or less. This can be varied somewhat. Also, the rod 30, for a particular sensor spacing will have a diameter that is about the same as the spacing of the opposed pairs, and will be about the same diameter as an actual welding rod.

Figure 3:
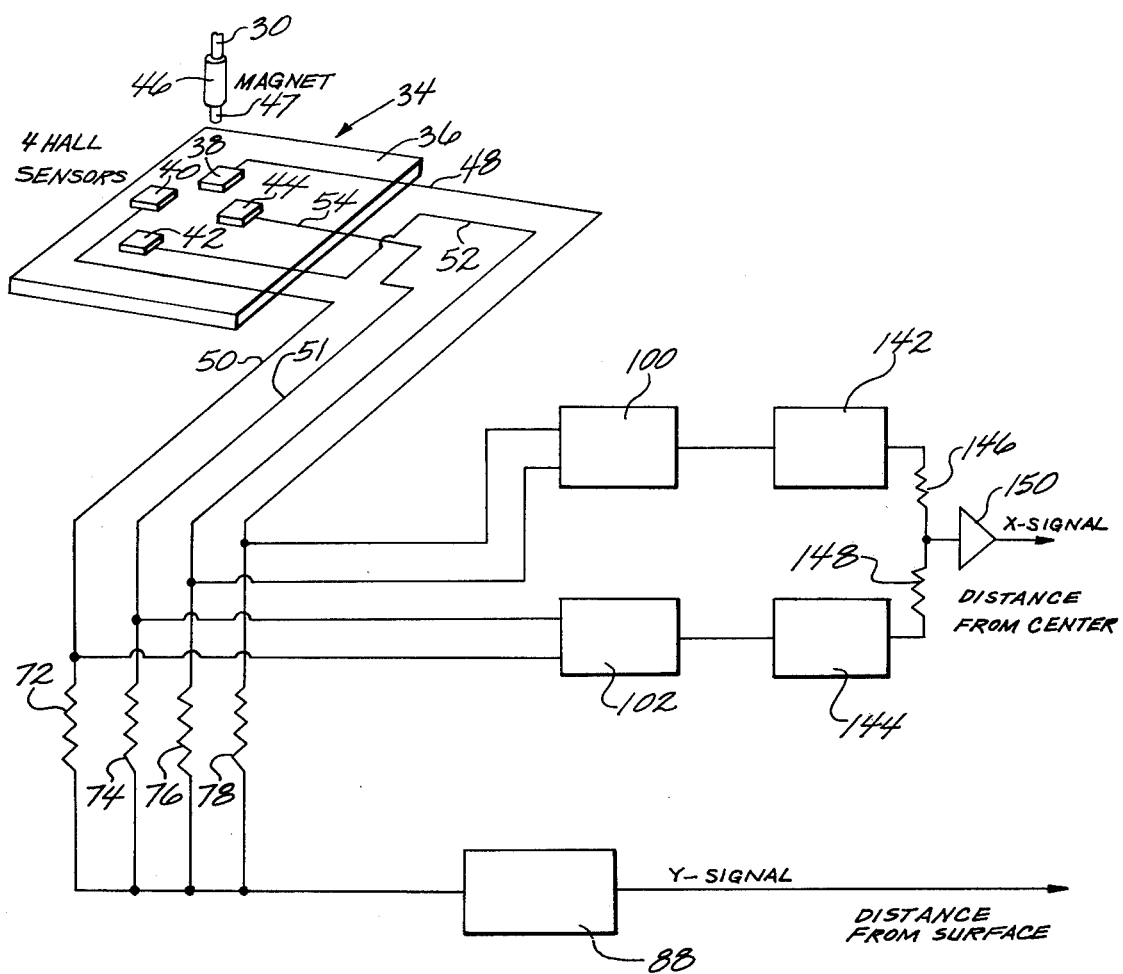
FIG. 3 is an enlarged view partly in perspective showing the magnetic sensor members and a simplified form of the circuit connections thereto.
Figure 5:
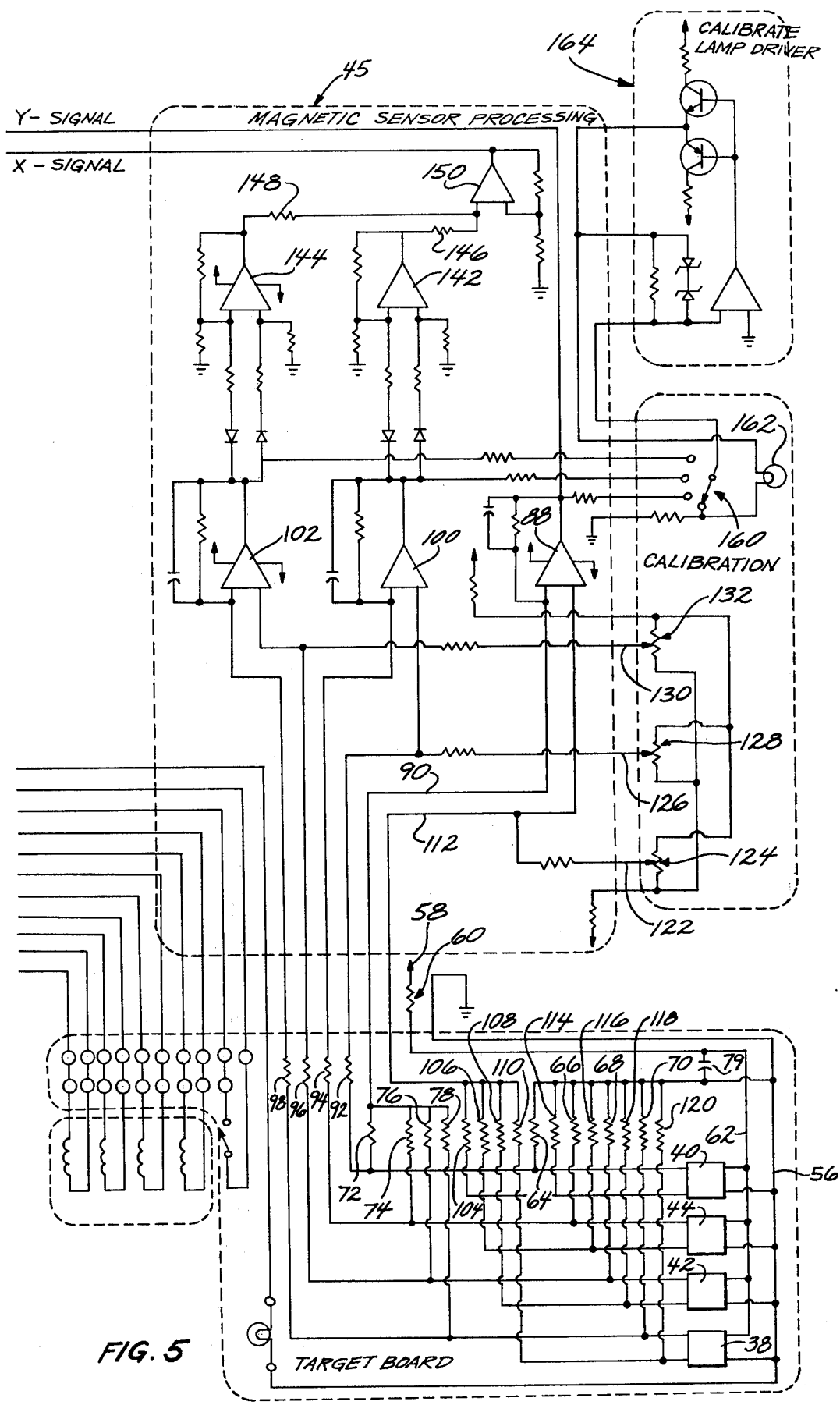
FIG. 5 is a schematic diagram of the circuits associated with the sensors employed in the present arc welding simulator device; and, FIG. 6 is a front elevational view of the control panel for the present device.

FIGS. 3 and 5 show the circuits most closely associated with the sensors 38-44. FIG. 3 is a somewhat simplified view while FIG. 5 shows the circuit connections and related circuit portions for the sensors more in detail. As shown in FIG. 5 each of the sensors has provision for four connections with one connection to each of the sensors being grounded by lead 56. Another connection to each of the sensors 38-44 is connected to a positive voltage source 58 through resistor 60 and lead 62, and the other two connections to each of the sensors are connected through resistors to various circuit locations. For example, each of the sensors 38-44 has one of these other connections connected through respective resistors 64-70 to ground and to one side of a capacitor 79, and the same sensor connections are also connected through respective other resistors 72-78 to one of two inputs of a differential amplifier 88 on lead 90. The same sensor connections are connected through other respective resistors 92-98 to inputs of other differential amplifiers 100 and 102 as well as to certain nulling potentiometers. In like manner, the fourth or remaining connections of each of the sensors 38-44 are connected through other respective resistors 104-110 to a second input to the differential amplifier 88 on lead 112. The sensor connections to the respective resistors 104-110 are also connected through other respective resistors 114-120 to ground.

Figure 2:
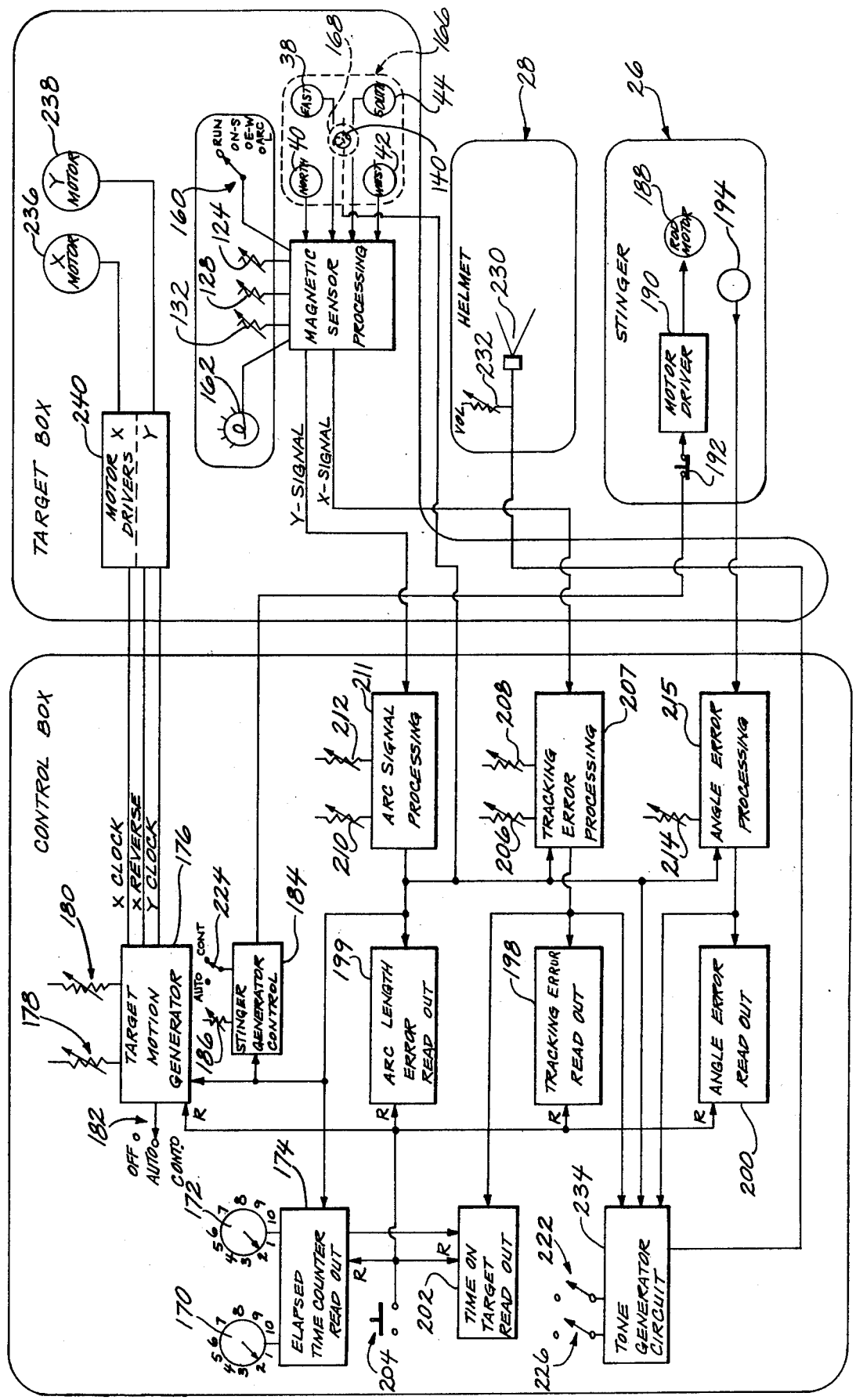
FIG. 2 is a block diagram showing the major circuit components and their interconnections in the subject arc welding simulator.
Figure 4:
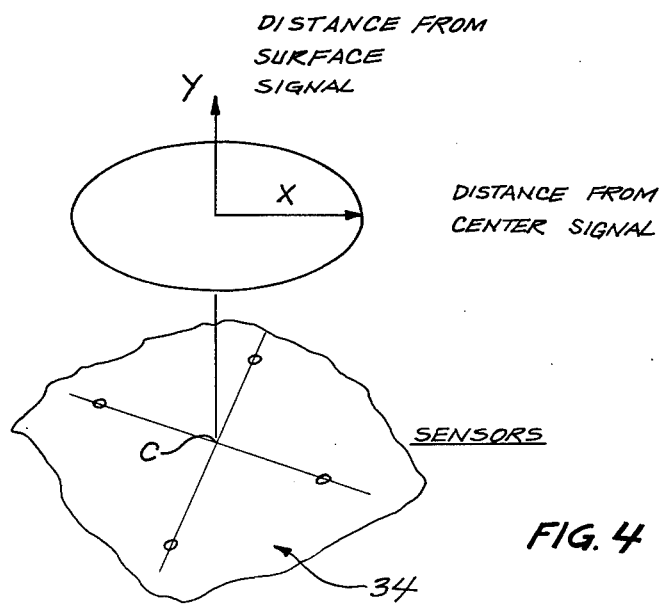
FIG. 4 is a perspective view illustrating schematically the relationships between the several output signals produced by the sensor unit.

The sensor outputs that pass through the resistors 104-110 to differential amplifier 88 result in generation of a Y-signal to arc signal processing 211, as shown in FIG. 2. The sensor outputs that pass through resistors 92-98 to amplifiers 100 and 102 ultimately result in generation of a X-signal, as will be more fully explained hereinafter, to tracking error processing 207, as shown in FIG. 2. Calibration potentiometers 124, 128, and 132 are employed with switch 160 and null light 162, as will be more fully explained hereinafter, to calibrate the circuitry of magnetic sensor processing 45 such that a null condition will exist between the sensors 38-44 when the magnetic member 47 of the rod 30 is positioned directly above the center C of the target area, as shown in FIG. 4. This null condition calibration will generally be set at the factory or manufacturing or calibration facility and in normal operation should not thereafter require user adjustment. A variety of user adjustable controls, as will be explained in more detail hereinafter, may be provided, however, to permit the user to achieve greater flexibility of operation of the device. The settings of these controls affect the operation of the circuitry in arc signal processing 211, tracking error processing 207, and angle error processing 215 as well as other blocks shown in FIG. 2, in ways which will be more fully explained. Depending upon the settings of these controls and the outputs from the sensors 38-44, appropriate visual and audio indications of the user's accuracy with the device will be fed back to him, and these features will also be more fully explained.

The target plate 25 is mounted for movement in the target assembly 24 on a moving carriage structure (not shown), whose movement along a path in the target assembly 24 is controlled by a limit switch at one end of the path, which switch causes the target plate to be automatically returned to the first end, and also by other controls which will be more fully explained in what follows. The four sensors 38-44 are mounted adjacent to the plate 25, and this plate also has a hole or aperture 140 through it at a central location relative to the sensors. The purpose of the aperture 140 will be described later. The sensors 38-44 as indicated are preferably Hall Effect devices which produce outputs that are proportional to the magnetic field around them and these fields are effected by the position and magnetic characteristics of the member 47 on the simulated rod 30. Each sensor of the type described produces a positive going or a negative going output. The positive outputs of the east and west sensors 38 and 42 are present on the sensor terminals connected to the resistors 98 and 96, respectively, and the positive outputs of the north and south sensors 40 and 44 are present at the respective resistors 92 and 94. These positive outputs are respectively amplified by the differential amplifiers 102 and 100. Since these amplifiers are driven differentially, their outputs will go to zero if both inputs thereto are equal. This condition will occur if both the north and south sensors 40 and 44 are in equal magnetic fields and if both the east and west sensors 38 and 42 are also in equal magnetic fields. As the magnet 47 moves closer to the target the magnetic field produced around the sensors will increase. As long as the magnet 47 is maintained equal distances from the opposed sensor pairs the outputs of the amplifiers 100 and 102 will be zero indicating that the welding rod 30 is centered on the target. This condition holds true regardless of the actual magnitude of the signals generated by the four sensors, and this makes it possible to sense the center of the target over a relatively wide range of distances of the rod from the target assembly 24.

The outputs of the differential amplifiers 100 and 102 will vary over positive and negative ranges depending on which sensor of the associated pair is closer to the magnet 47 (in a stronger field). Because of this, each of the amplifiers 100 and 102 is followed in the circuit by a respective absolute value amplifier 142 and 144. This type of amplifier will always have the same value or magnitude of output as the input applied thereto but the output will always have a positive polarity regardless of the polarity of the input. In other words regardless of whether the output of the amplifier 100 is a positive or negative voltage, such as 4 volts, the outputs of the amplifier 142 will be positive, and in the case described will be a positive 4 volts. The same is true of the amplifier 144.

The outputs of the two absolute value amplifiers 142 and 144 are combined or summed by resistors 146 and 148 which have their output sides connected together, and the summed output is applied as an input to another amplifier 150. This output will always be positive and will be proportional to the distance between the magnetic tip 47 of the simulated welding rod 30 and the center of the target area. However, the resistors 146 and 148 may have different resistances so that the tracking sensitivity will be greater in the east-west direction than in the north-south direction or vice versa.

Referring again to FIG. 5, the resistors 72-78 sum the positive outputs of the sensors 38-44 and the resistors 104-110 sum the negative outputs therefrom. These two summations are applied as separate inputs to the differential amplifier 88 where they are amplified. The output of the amplifier 88 therefore is a signal that represents the raw arc length, and this signal is further processed by other circuits located in the console 22. The final output of the sensors in the target assembly 24 is therefore two signals, one being the raw arc length signal Y (FIG. 4) which varies positively and negatively and is proportional to the distance from the target plate 25 to the magnetic tip 47 of the simulated welding rod 30, and the other is the raw tracking signal X which is always positive and is proportional to the lateral distance between the tip 47 of the rod 30 and the center C of the target area.

The subject device includes means for individually calibrating the sensor means including the pairs of opposed sensors and the circuits associated therewith. The calibration means include a multi-position switch 160 which has four setting positions as shown in FIG. 2, and is used, depending on the selected setting, for individually calibrating north-south null, east-west null, and arc length null. The fourth setting position of the switch 160 is the RUN position and the switch is maintained in this position during simulated welding operations. The switch 160 is preferably located on the target assembly 24. A null lamp 162, also on the target assembly 24, is associated with the calibration means and has its own driver circuit 164, the details of which are also shown in FIG. 5. The driver circuit 164 operates in conjunction with the magnetic processing circuits described above and with the switch 160, but the structural and operational details of the lamp driver circuit 164 need not be discussed in detail to a full and complete understanding of the invention. The various circuits and circuit connections associated with the amplifiers 88, 100 and 102 likewise are not described in detail since their constructions and operations will be readily apparent to those skilled in the art. It is to be understood, however, that various equivalent circuits and circuit elements as well as different circuit parameters could be used without departing from the invention.

In FIG. 2 is shown in block form all of the more important components of the present device and their interconnections. Corresponding controls are also identified on the console control panel of FIG. 6. The Hall Effect sensor elements 38-44 are included in the dotted outline 166 and are located in close association with, and move with, the target plate 25. The target plate aperture 140 is centrally located in the target plate 25 with respect to the sensors 38-44, and a target bulb 168 is located on the movable target plate 25 at a location behind the aperture 140. The target bulb 168 is energized whenever there is a simulated arcing condition to give a visual indication thereof. The bulb 168 preferably is energized by a relatively high frequency alternating current source so that the power provided therefor will have little or no effect on the operation of the sensors 38-44. As stated the bulb 168 provides the operator with a visual indication of the presence of an arcing condition, and the operator may be provided with an audible indication of an arcing condition by means of a speaker mounted on the helmet and associated circuit means all of which will be described later.

Other portions of the circuit as shown in FIG. 2 include an exercise time control 170 and a rest time control 172. Both of the controls 170 and 172 have a plurality of setting positions, are adjustable to establish different time periods, and a visual counter or register 174 is located on the console 22 in association therewith to indicate the amount of time that has lapsed during their respective control periods. The exercise counter control 170 is used to control or time out the length of a simulated welding period and this control records only the time that the welding rod 30 is maintained in an arcing position relative to the target. The rest counter control 172, on the other hand, is used to time rest periods which occur between simulated exercise periods and a rest period follows each simulated welding period. The duration of the rest periods as preset by the control 172 provides periods measured in real time which can be adjusted as desired but is not under control of any action by the operator in any way similar to the exercise time period which times out only when there is an arcing condition. The duration of the exercise time periods and of the rest time periods are each adjustable by the respective controls 170 and 172 located on the console 22.

The subject device also includes a target motion generator 176 and associated settable control means including switch means 178 which are adjustable to establish a desired target speed, a multi-position width control 180, and a control 182 which has three setting positions including one for its off condition, one for automatic (AUTO) operation and one for continuous (CONT) operation.

The stinger assembly 26 has its own motion generator control circuit 184 which includes adjustable means 186 for adjusting the simulated burn rate which is the rate at which the simulated welding rod 30 moves in the stinger assembly 26. The stinger assembly 26 also includes a rod motor 188 controlled by a motor driver circuit 190. The motor 188 is energized during operation to move the rod 30 in the stinger assembly. The rod 30 has teeth 45 formed along one side which cooperatively engage a toothed gear (not shown) on the motor 188 to produce the desired rod motion. However, the connection between the motor gear and the rod teeth 45 is such that the operator can push the rod through the stinger assembly 26 to restore it to its extended condition. This simulates installing a new welding rod in a welding machine. A switch 192 is provided on the stinger assembly 26 which the operator depresses at various times to deenergize the motor 188 and stop the rod motion, and it is during these times that the operator pushes the rod back to its extended position. A cap 193 may be provided on the end of the rod 30 opposite the end when welding occurs to facilitate pushing the rod. The stinger assembly 26 also carries a sensor 194 which is responsive to the angular orientation of the rod 30. The sensor 194 may be a mercury type switch or like device. The stinger 26 has an arrow 195 printed or otherwise formed on it and the direction of the arrow 195 can be adjusted to accommodate a particular angular orientation for the rod 30. The direction established for the arrow 195 also determines a central position from which angle errors are indicated.

Other elements of the present device include various other circuits and circuit controls used to establish different control settings and readouts. Most of these are located on the console 22. In FIG. 6 there are shown provisions for five readout devices or counters and their associated controls. These include a lapse time readout counter 174 under control of the exercise timing control 170 and the rest timing control 172, a tracking error readout counter 198, an arc length error readout counter 199, a readout counter 200 for indicating the number of angle errors, and a time on target readout counter 202 for recording the time during a simulated welding operation that the operator is maintaining the welding rod 30 in both a proper tracking condition and proper arcing condition. There is also a reset switch or reset button 204 located on the control panel which when actuated resets all of the readout counters 174 and 198-202 and also affects the target motion generator 176 to cause target plate 25 to return to the beginning of its path in target assembly 24.

Associated with the tracking error readout counter 198 are a tracking sensitivity control 206 and a tolerance control 208. These controls are adjustable or settable to establish limits of desired tolerance and sensitivity conditions which also define the conditions necessary to produce recordable tracking errors. By rotating the sensitivity control 206 clockwise, the sensitivity to register tracking errors is increased. That is to say the higher the setting the shorter the period of time that the rod 30 can remain out of the simulated puddle without counting a tracking error. For example, at a setting of 2, the rod can be off target for up to 0.8 second without registering an error while for a setting of 10 the rod 30 can be off target for only 0.1 second without registering an error. The tolerance control 208, on the other hand, controls the width of the programmed puddle, and the higher the setting the narrower will be the track or puddle width.

Associated with the arc length error readout counter 199 are an arc length control 210 which can be adjusted to establish a desired arc length, and a tolerance control 212 which is settable to establish the tolerance or range of acceptable arc lengths. When the arc length exceeds the established tolerance an arc length error will be indicated by being recorded on the readout counter 199. By rotating the arc length control 210 clockwise the arc length will be decreased and vice versa. By rotating the arc length tolerance control 212 clockwise the tolerance for electrode to target distance is tightened. For example, a ⅛" arc length setting and a 1/16" arc tolerance setting will allow moving the rod tip up to 1/16" up or down from the ⅛" position without registering an error.

The angle error readout counter 200 has associated with it a sensitivity control adjustment 214 which is used to control the extent of angular variation in the movement of the rod 30 that will cause an angle error to be entered in the counter 200. As the control 214 is moved clockwise the time allowed for an off angle condition before an angle error will be indicated is decreased. A setting of 1 allows an error to be made up to one second, a setting of 10 only allows for an angle error to be present for only up to 0.1 second. The orientation of the mercury switch 194 in the stinger 26 is set to establish the desired welding rod orientation around which error and non-error conditions are produced. This is adjustable as desired.

The burn rate control 186 is also located on the console 22 and includes a member that can be set to different positions to establish any desired burn rate within the range of the device. In the present device, the simulated burn rate is the rate at which the simulated welding rod 30 moves in the stinger assembly 26. This adjustment adjusts the operating speed of the rod motor 188. In an actual device the burn rate is adjustable to rod movement rates between approximately 6" of movement per minute to approximately 15" of movement per minute.

The time-on-target readout counter 202 is influenced by speed control 178 which is located on the console associated with target motion generator 176 and is adjustable to regulate the speed of movement of the target. There is also a path width control 180 which is adjustable to establish different desired widths for the welding path. The welding path width may be varied between a zero path width, which means that the target plate 25 moves in a straight line path, and different other settings which establish different width zigzag welding paths. The welding path, except when set to zero width, always has a zigzag shape. In a typical device constructed according to the present invention the path width can be varied from the zero or straight line condition to a path width up to about ⅜" although this is not the total possible range. Also, the movement of the target plate 25 is preferably an intermittent movement made up of a series of time spaced movements between corners of the zigzag path with the movement times representing about ⅓ of the total target motion time so that the target is actually motionless for about ⅔ of the time. The motionless times which occur at the corners allow time for the weld puddles to form which is very important in an actual welding operation. When the target speed control 178 is rotated clockwise, the speed of the target movement is increased and vice versas. A setting of 2 provides a target movement of approximately 2" per minute and a setting of 6 provides a target movement of approximately 6" per minute. This control is set in advance of each exercise. As the target path width control 180 is rotated clockwise to adjust the path width, for any particular setting of the target speed, the speed of target movement will remain the same with respect to motion in inches per minute. This means that the actual target travel with a target speed of 6" per minute and a ⅜" path width will be considerably more than for the same target speed setting and a zero path width setting.

Other miscellaneous controls are also provided on the console 22. For example, there is an on-off power switch 220, an on-off tracking tone switch 222, a rod consumption control switch 224 that has auto and continuous arc setting positions, an angle tone control switch 226 that has on and off positions, and a motion control switch 182 that has three setting positions including a continuous position, an auto position and an off position. The switch 182 is provided to control the operation of the target. By selecting the off setting position there will be no target motion, bu selecting the automatic setting position there will be target motion only when there is a good arc, and by selecting the continuous setting position there will be continuous arc movement regardless of the arc.

The helmet 28 which is worn by the operator during simulated welding operations has a speaker 230 located on or in it to audibly indicate to the operator how he is doing. The speaker 230 makes tones such as a hissing tone to indicate a usual arcing sound and it may be set to make noises or tones to indicate the different errors that occur. A volume control 232 is provided for the speaker and the three types of signals that are generated by the speaker include a hissing sound which simulates the presence of an arcing condition, a relatively high tone to indicate angle errors and a relatively lower tone to indicate tracking errors. In FIG. 2 the speaker 230 is shown operatively connected to the track signal processing circuitry 207 which is the circuitry associated with the tracking error readout counter 198, the time-on-target readout counter 202 and tone generator circuit 234. The speaker 230 also has connections to other parts of the circuit as well.

In order to operate the present device it is first necessary to establish a set of desired parameters or operating conditions. This includes establishing the desired exercise time, the desired rest period time, a desired target speed and path width, a desired burn rate, and it is necessary to make adjustments for tracking sensitivity, arc length tolerance and angle sensitivity. These parameters are established after the sensors have first been calibrated. With the device adjusted to a desired set of operating conditions the operator will put on the helmet and take the stinger assembly 26 which includes a handle 235 in his hand and before starting a simulated operation will press the reset button or switch 204 on the console 22 and will proceed to follow the movable target plate 25 maintaining the proper angular an positional relationships of the simulated welding rod 30 as the welding rod moves in the stinger assembly 26. If the operator does not hold the stinger assembly within the established proper angular orientation for the time selected by the sensitivity adjustment means, errors will be indicated on the angle error readout counter 200, if he deviates from the desired track by an amount in excess of the tolerance requirements and for the preset time interval an error will be indicated on the tracking error readout counter 198, and if he does not maintain a proper arc length an error will be indicated on the arc length error readout counter 199. During the time that the operation is in progress, the exercise lapse time readout counter 174 will be counting or keeping time of the periods during which the rod is maintained in an arcing condition and until the duration of the exercise period is over when the exercise counter 174 will stop counting and its associated circuits will operate to energize the rest time control readout which also is read on the counter 174 which counts in real time during the rest periods. During this time the operator will not be simulating welding. During the time that the exercise is in progress the time on target readout counter 202 will also be recording the time that the operator is able to maintain the simulated welding rod 30 tracking on the target. If the operator were able to maintain the rod 30 tracking all the time, the time recorded on target counter 202 would be the same as the time recorded on the elapse time readout counter 174. However, this is usually not possible because the operator will periodically have to lift the rod 30 away from the target in order to push the rod 30 back through the stinger assembly 26, and this in itself will cause errors. After a simulated welding operation has been completed there will be a record of the number of each of the possible types of errors that occurred, and this will indicate the proficiency of the operation in each catagory and will pinpoint where the operator is having trouble.

The motor drive means for the target include motor means for producing motion in the east-west or transverse direction and motor means for producing motion in the north-south or longitudinal direction. Separate motors 236 and 238 are provided for this purpose and are operatively connected to the X and Y drivers 240. During operation of the device the path width which has been established will cause the target plate 25 to follow a zigzag path, as aforesaid. The device is constructed so that the target plate 25 will be moving approximately ⅓ of the total time and will be at rest at the corner locations of the simulated zigzag welding path for approximately ⅔ of the total time. The pauses that are produced as aforesaid are important because they enable welding puddles to form and to settle in a manner simulating an actual welding operation. The symmetrical zigzag shape of the welding path that is produced when the path width control is set to other than its zero position is a relatively easy path for an operator to follow especially with the pauses at the corners.

It is important to recognize that the present device is a passive type simulator device in the sense that the sensor elements employed respond to the magnetic characteristics of the member 47 located on the simulated welding rod regardless of its location within limits but do not require that the operator maintain means such as a light source or other means located on the simulated welding rod or in the stinger assembly aimed in a particular directional relationship toward a device such as a light sensitive device or sensor as is true of the Schow et al construction discussed above. The construction and operation of the sensor means employed in the present device also provide much more information and much more precise and accurate control and adjustment than the sensor means of prior art devices. The fact that the present device is basically a passive device for the reasons stated while the Schow et al device is basically an active device is a fundamental difference between the devices.

As indicated above, the present device provides means for training welders without wasting any materials and at the same time provides accurate means for monitoring and recording the various abilities of the operator including the ability to maintain a simulated rod on target, the ability to maintain the proper arc length, the ability to maintain a proper angular orientation of the welding rod, and all of these conditions can be varied to produce different operating conditions and different sensitivities for personal evaluation and training as desired. Furthermore, after each simulated welding operation a great deal of information will be known about the performance of the operator, and the same information can be obtained for a large number of different possible operating conditions. This means that the subject device can be used to train an operator or give an operator experience in one or more of the skills required, it can be used to improve certain skills more than others, it can be used to give the operator practice, and as indicated, it can be used to evaluate the performance of various operators in order to weed out those persons who have little or no aptitude for arc welding.

The use of a light such as the target light 168 to simulate an arcing condition is desirable to give a realistic feeling to the present device. It should be recognized, however, that the light 168 has no other purpose in the device except to provide the apperance of an arcing condition. That is to say the light from the bulb 168 does not produce any responses, electrical or otherwise, and the same illumination produced by the light 168 is also available to the operator in the form of the hissing sound produced in the speaker 230.

Thus there has been shown and described a novel device for training and evaluating arc welding operators which fulfills all of the objects and advantages sought therefor. It will be apparent, however, to those skilled in the art that many changes, modifications, variations and other uses and applications of the subject device are possible. All such changes, modifications, variations and other uses and applications which do not depart from the spirit and scope of the invention are deemed to be covered by the invention which is limited only by the claims which follow.

What is claimed is:

1. A device for training and evaluating the performance of a person such as an arc welder comprising a work surface including an element representing a member to be welded, means for predeterminately moving the element to simulate a weld path, a rod holder component including handle means whereby an operator can hold and manipulate the component relative to the work surface element, a member simulating a welding rod having a free end and means on the rod holder for supporting the simulated welding rod member for movement thereon while the operator is following the work surface element, means having detectable magnetic characteristics located on the welding rod member adjacent to the free end thereof, sensor means associated with the movable work surface element in position to respond to the presence of the means on the simulated welding rod having magnetic characteristics, said sensor means including angularly related pairs of spaced opposed sensor members capable of having electric responses produced therein when they are located in the field of said means having magnetic characteristics, the electric responses produced in the respective sensor members varying with the distance thereof from the free end of the simulated welding rod, and circuit means operatively connected to the sensor members, said circuit means including means for producing a first output which varies with the distance between the welding rod member and the movable work surface element and a second response which varies with the position of the free end of the rod member relative to the pairs of opposed sensor members.

2. The device defined in claim 1 including means located on the rod holder responsive to the angular orientation of the rod member, said means including means for producing a predetermined electric response whenever the angular orientation of the rod member relative to the work surface exceeds some predetermined angular orientation by more than a predetermined amount.

3. The device defined in claim 1 wherein said sensor members are Hall Effect devices.

4. The device defined in claim 1 wherein said circuit means includes a pair of amplifier devices each having a pair of inputs and an output, means operatively connecting the sensor members of one of said pairs to the respective inputs of one of said amplifier devices, means operatively connecting the sensor members of the other of said pairs to the respective inputs of the other amplifier device, and means for summing the outputs of said pair of amplifier devices.

5. The device defined in claim 1 including timer means to control the time duration of a simulated welding operation.

6. The device defined in claim 1 including an amplifier means having at least two inputs and an output and means operatively connecting all of the sensor members of said opposed pairs to the inputs of said amplifier means.

7. The device defined in claim 1 including separate circuit means operatively connected to the sensor members of each of said pairs of opposed sensor members, said separate circuit means including means for individually adjusting the response characteristics of the pairs to the presence of the means having detectable magnetic characteristics.

8. The device defined in claim 1 wherein said means predeterminately moving the element simulating the work surface to be welded includes means capable of generating linear motion therefor.

9. The device defined in claim 1 wherein said means predeterminately moving the element simulating the work surface to be welded includes means capable of generating a zigzag type motion thereto.

10. The device defined in claim 1 wherein said means predeterminately moving the element simulating the work surface to be welded includes means capable of generating a zigzag type motion, and means adjustable to vary the width of the zigzag motion.

11. The device defined in claim 1 including means for predeterminately adjusting the rate of movement of the rod member relative to the rod holder to simulate a desired rod consumption rate.

12. In a device to be used to simulate arc welding which includes a simulated target member representing the object to be welded, means for predeterminately moving the target member to simulate a welding path having a principal movement direction, a simulated welding rod and a holder for the rod which includes means to move the rod therein to simulate a rod burn rate, the improvement comprising means associated with the target for producing responses which vary with the position of the simulated welding rod relative to the target, said means including first and second pairs of sensor members, said first pair of sensor members being oriented substantially in alignment with the principal direction of movement of the target and said second pair of sensor members being oriented substantially transversely to the principal direction of movement of the target, and means on the simulated welding rod for producing a magnetic field which is capable of being detected by the sensor members of said first and second pairs.

13. In the device of claim 12 the further improvement of circuit means operatively connected to the sensor members, said circuit means including a first portion producing a response that varies with the distance between the simulated welding rod and the target and a second portion producing a response that represents the positional relationship of the simulated welding rod relative to the sensor members of said pairs.

14. In the device defined in claim 12 said means for predeterminately moving the target member to simulate a welding path includes means to move the target member in a zigzag manner.

15. In the device defined in claim 14 the further improvement of means to adjust the width of the zigzag path.

16. In the device defined in claim 12 means associated with said first pair of sensors for adjusting the sensitivity of said sensors to the magnetic field produced by the means on the simulated welding rod.

17. In the device defined in claim 12 means to adjust the sensitivity of said second pair of sensor members to the magnetic field produced by the means on the simulated welding rod.

18. In the device defined in claim 12 including means for establishing a predetermined time interval and means for producing a welding tracking error whenever the means on the simulated welding rod for producing a magnetic field are maintained for a predetermined time beyond a predetermined distance from the sensor members of said first pair of sensor members.

19. In the devide defined in claim 12 including means for establishing a predetermined time interval and means for producing a welding tracking error whenever the means on the simulated welding rod for producing a magnetic field are maintained for a predetermined time beyond a predetermined distance from the sensor members of said second pair of sensor members.

20. In the device defined in claim 12 wherein said target member include means energizable to simulate an arcing condition.

21. In the devide defined in claim 12 a helmet to be worn by the operator, said helmet including means for producing a distinctive audible signal to simulate an arcing condition, and means operatively connecting said first and second pairs of sensor members to said means for producing an audible signal whereby predetermined positions of said means on the welding rod for producing a magnetic field relative to the first and second pairs of sensor members will operate to generate a audible signal in said means on the helmet.

22. In the device defined in claim 12 a helmet to be worn by the operator, said helmet including means for producing an audible signal to simulate errors in the arcing condition including means operatively connecting said first and second pairs of sensor members to the means on the welding rod for producing a magnetic field, said means producing an audible signal including means to produce a distinctive audible signal to indicate an error in the arcing condition whenever the welding rod is moved to a predetermined condition relative to said first and second pairs of sensor members.

23. In the device defined in claim 12 a helmet to be worn by the operator, said helmet including means for producing a distinctive audible signal to simulate errors in tracking, said means including means operatively connecting said first and second pairs of sensor members to said means in the helmet for producing audible signals, said means producing a distinctive audible signal to represent errors in tracking whenever the means on the welding rod for producing a magnetic field has a predetermined positional relationship relative to said first and second pairs of sensor members.

24. In the device defined in claim 12 the further improvement of means on the holder for the simulated welding rod for establishing a predetermined angular orientation thereof, means for establishing a predetermined time period, and means for generating an error signal to represent a predetermined duration in the angular orientation of the welding rod whenever the angular orientation of said simulated welding rod differs from said predetermined angular orientation by a predetermined amount for a predetermined time period.

25. In the device defined in claim 12 the further improvement of a console having means thereon for establishing a preselected set of operating conditions.

26. In the device defined in claim 25 wherein said means on the console for establishing a preselected set of operating conditions includes means adjustable to establish a predetermined welding exercise time period.

27. In the device defined in claim 25 the further improvement of means on the console adjustable to establish a predetermined tracking sensitivity.

28. In the device defined in claim 25 the further improvement of means on the console adjustable to establish a predetermined tracking tolerance.

29. In the device defined in claim 25 the further improvement of means on the console adjustable to establish a predetermined arc length tolerance.

30. In the device defined in claim 25 the further improvement of means on the console adjustable to establish a predetermined condition necessary to produce an arc length error.

31. In the device defined in claim 25 the further improvement of means on the console adjustable to establish a predetermined speed of movement for the target member.

32. In the device defined in claim 25 the further improvement of means on the console adjustable to establish a predetermined simulated welding path width.

* * * * *